United States Patent Office 3,468,889
Patented Sept. 23, 1969

3,468,889
O-AND/OR S-NICOTINOYL DIACYLTHIAMINES AND ACYLATION PROCESS FOR PREPARING THE SAME
Haruki Nishimura, Toyonaka-shi, Hiroaki Kinugasa, Amagasaki-shi, and Kumio Onishi, Hiraoka-shi, Japan, assignors to Dainippon Pharmaceutical Co., Ltd., Osaka, Japan, a corporation of Japan
No Drawing. Filed Nov. 15, 1966, Ser. No. 594,393
Claims priority, application Japan, Nov. 18, 1965, 40/71,214; Nov. 19, 1965, 40/71,205; Dec. 2, 1965, 40/74,289; Dec. 18, 1965, 40/78,156; Dec. 20, 1965, 40/78,755; June 4, 1966, 41/36,183; June 18, 1966, 41/39,765; June 24, 1966, 41/41,205, 41/41,206
Int. Cl. C07d 99/12; A61k 15/12
U.S. Cl. 260—256.5                              30 Claims

ABSTRACT OF THE DISCLOSURE

Diacylthiamines of the formula

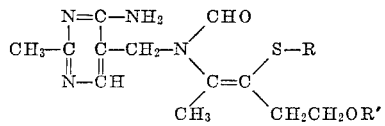

wherein one of the R and R' represents nicotinoyl, and the other represents a member selected from the group consisting of nicotinoyl; benzoyl; alkyl substituted benzoyl, wherein the alkyl group contains from 1–4 carbon atoms; substituted alkanoyl wherein the substitution is group has 1–4 carbon atoms; alkanoyl of 1–18 carbon atoms; substituted alkanoyl wherein the substitution is selected from alkoxy of 1–4 carbon atoms, halogen and phenyl, wherein the alkanoyl group has 1–18 carbon atoms; and furoyl. Such compounds are useful as active vitamin $B_1$ agents having rapid and prolonged $B_1$ activities.

The present invention relates to novel diacylthiamines in which at least one of the acyl groups is nicotinoyl, and N-oxides thereof as well as pharmaceutically acceptable acid addition salts thereof.

The novel diacylthiamines of the invention are represented by the formula

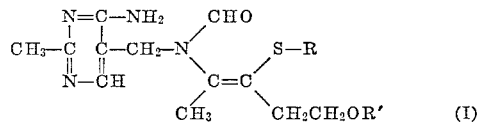

in which one of the R and R' stands for nicotinoyl, and the other stands for nicotinoyl, benzoyl, alkyl-(preferably having 1–4 carbons) and/or alkoxy-(preferably having 1–4 carbons) substituted benzoyl, alkanoyl (preferably having 1–18 carbons), alkoxy-(preferably having 1–4 carbons), halogen-(preferably chlorine, bromine or iodine) and/or phenyl-substituted alkanoyl (of which the alkanoyl moiety preferably having 1–18 carbons), or furoyl.

Among the novel diacylthiamines of the Formula I, those which are preferred include: O,S-dinicotinoyl-thiamine; S-nicotinoyl-O-benzoyl, -O-stearyl, -O-myristoyl, -O-lauroyl, -O-palmitoyl, -O-propionyl, -O-acetyl, -O-iso-butyroyl, -O-butyroyl or -O-valeryl-thiamines; O-nicotinoyl-S-benzoyl, -S-p-methylbenzoyl, -S-p-methoxybenzoyl, -S-stearoyl, -S-lauroyl, -S-palmitoyl, -S-capryl, -S-myristoyl, -S-acetyl, -S-propionyl, -S-butyroyl, -S-isobutyroyl, -S-valeryl, -S-furoyl, S-methoxyacetyl or -S-chloroacetyl-thiamines; inter alia, O,S-dinicotinoyl -thiamine, O-benzoyl-S-nicotinoylthiamine, S - benzoyl-O-nicotinoyl-thiamine, S-acetyl-O-nicotinoylthiamine, S-butyroyl-O-nicotinoylthiamine and S-isobutyroyl-O-nicotinoylthiamine being particularly preferred.

The diacylthiamines of the Formula I, N-oxides thereof and pharmaceutically acceptable acid addition salts thereof show, when orally administered, excellent absorption from the entera and very high vitamin $B_1$ level in blood. Furthermore, while an increased dose of thiamine chloride hydrochloride does not result in an increased amount of absorption from the entera, in contrast thereto the absorption of the compounds of the invention increases proportionally to the dose administered, to maintain the high vitamin $B_1$ level in blood in vivo over a prolonged period. The compounds of the invention also have high affinity to the cells of living tissues, and are transferred at high concentrations particularly to liver which is the main internal organ to participate in the formation of cocarboxylase. They also show far stronger resistivity to aneurinase. Still in addition, they give not only high ratio of cocarboxylase level in blood to vitamin $B_1$ level in blood. Accordingly they are highly useful as an active vitamin $B_1$ agent having rapid and prolonged vitamin $B_1$ activities. Again, it has been found that the coupling of vitamin $B_1$ with nicotinic acid in accordance with the invention notably inhibits the undesirable side effect of the conventional nicotinic acid agent. Still another advantage of the compounds (I) is that they give durable higher level of NAD (nicotinamide adenine dinucleotide) than the corresponding amount of nicotinic acid. And, the compounds of the invention are also useful for prevention and medical treatment of vascular troubles, as they release nicotinic acid in vivo and promote blood circulation with the nicotinic acid activities. Thus, they are also useful as a nicotinic acid agent having desirable nicotinic acid activities.

The diacylthiamines of the Formula I may be prepared from an inorganic acid salt of O-acylthiamine of the formula

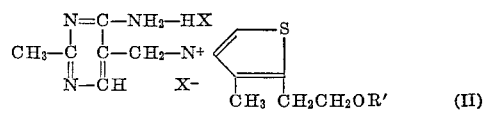

or S-acylthiamine of the formula

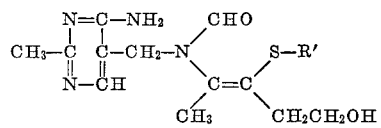

by acylating the foregoing with an acylating agent of the formula $$Y—R \qquad (IV)$$

in the manner known per se. In these formulae R and R' have the signification already defined and X stands for anion of the inorganic acid, and Y stands for the residue of the acylating agent.

Inorganic acid salts of O-acylthiamine of the Formula II and S-acylthiamines of the Formula III which are used as the starting materials can pe prepared by acylation of inorganic acid salts of thiamine, and some of which as well as the processes for the preparation thereof have been disclosed in literatures.

Concerning S-acylthiamines, Japanese patent publication No. 18390/1963 teaches that S-benzoylthiamine, S-p-methylbenzoylthiamine, S-furoylthiamine and the like can be obtained by acylation of thiamine chloride hydrochloride by the corresponding sodium acylthiosulfate in the presence of strong base. Japanese patent publication No. 21372/1964 discloses that S-palmitoyl-, S-lauroyl-, S-capryl-, and S-caproylthiamines can be obtained in the similar manner to the above. Also Japanese patent publication No. 21373/1964 discloses that S-alkanoyl-thiamines, e.g., S-caproyl-, S-propionyl-, S-butyroyl-, S-hexanoyl- and S-heptanoyl-thiamines, can be formed by acylation of inorganic acid salts of thiamine by the corresponding alkanoylchloride in the presence of ethyl acetate. The preparation method of S-butyroyl thiamine by the acylation with acid anhydride is disclosed in U.S. Patent No. 2,752,348, and Japanese patent publication No. 1396/1965 teaches a process for the preparation of S-benzoylthiamine in which sodium salt of thiol-type thiamine is acylated with benzoylchloride in an anhydrous organic solvent.

S-nicotinoylthiamine has not been disclosed in any of the prior art. Presumably the same can be formed by known acylating means as described in the above, for example, by the acylation of thiamine chloride hydrochloride with an equimolar amount of nicotinic anhydride in the presence of sodium hydroxide, but this is unfavourable because it causes by-production of O,S-dinicotinoyl-thiamine in considerably large quantity. It has been found that S-nicotinolythiamine is readily produced by reacting an inorganic acid salt of thiamine in the presence of a strong base with an equimolar amount of S-nicotinoyldithiocarbamate of the formula

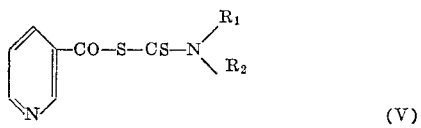

(V)

wherein $R_1$ and $R_2$ each stands for alkyl (preferably having 1–4 carbons) or phenyl radical, or $R_1$ and $R_2$ when taken together with the nitrogen atom represent a heterocyclic ring such as pyrrolidine, piperidine or piperazine, or with an equimolar amount of alkyl S-nicotinoylxanthogenate of the formula

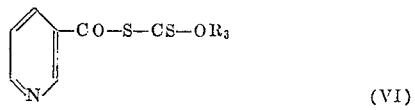

(VI)

wherein $R_3$ represents alkyl, preferably having 1–4 carbons.

The reaction is preferably performed in such solvents as water, alcohol, or a mixture of water and alcohol, or a mixture of water with an organic solvent which is miscible with water such as dioxane. Examples of appropriate strong base include hydroxides and alcoholates of alkali metals such as sodium and potassium. The dithiocarbamate reactant or xanthogenate reactant may be added as it is, or may be dropped as a solution in an appropriate solvent such as chloroform or ethyl aceate. The reaction is advantageously performed at the temperatures ranging approximately 0°–10° C., with salting out by, for example, sodium chloride. This S-acylation method is also applicable with greater advantage for the preparation of known S-acylthiamines such as S-benzoylthiamine, by employing the corresponding S-acyldithiocarbamate or S-acylxanthogenate. Specific examples of S-acylthiamine preparation in this manner will be given hereinbelow.

S-NICOTINOYLTHIAMINE

Thiamine chloride hydrochloride 3.37 g. was dissolved in 15 ml. of water, and after addition thereto of 12 ml. of 10% aqueous sodium hydroxide under ice cooling, the solution was allowed to stand for 30 minutes. The same was then saturated with sodium chloride to which 10 ml. of chloroform solution containing 3 g. of crude S-nicotinoyl-N,N-dimethyldithiocarbamate was added with violent agitation during about 10 minutes. After the subsequent an hour's agitation, the crystals formed were filtered, washed with a small amount of chloroform and then that with ice water and dried. Thus 2.8 g. of S-nicotinoylthiamine having a melting point of 88–91° C. was obtained.

The manner of preparation of the S-nicotinoyl-N,N-dimethyldithiocarbamate used in the above process was as follows.

Nicotinoyl chloride 1.8 g. was dissolved in 4 ml. of tetrahydrofuran under ice cooling, and to the resultant solution further 2 g. of dimethylammonium-N,N-dimethyldithiocarbamate was gradually added. After addition of ice water, the precipitated crystals were filtered and washed with water to yield 2 g. of the product having a melting point of 70–72° C.

S-BENZOYLTHIAMINE (A) Thiamine chloride hydrochloride 3.37 g. was dissolved in 24 ml. of water and to the resultant solution 12 ml. of 10% sodium hydroxide was added under ice cooling. After 30 minutes' standing, to the solution was added with 2.2 g. of powdered S-benzoyl-N,N-dimethyldithiocarbamate with violent agitation. After an hour the reaction mixture was filtered, and the precipitate was washed first with ice water and then with ether, and dried to produce 3.5 g. of S-benzoylthiamine having a melting point of 145–7° C.

The S-benzoyl-N,N-dimethyldithiocarbamate used in the above process was prepared as follows. Dimethylammonium-N,N-dimethyldithiocarbamate 6.0 g. was dissolved in 10 ml. of water, and while the solution was cooled with ice, 3 ml. of triethylamine was added thereto with agitation, and then 5.0 g. of benzoyl chloride was slowly added. Whereupon crystalline precipitate was obtained which, when recrystallized from chloroform-hexane, produced 7.0 g. of the product having a melting point of 57–59° C.

(B) To 3.37 g. of thiamine chloride hydrochloride 30 ml. of 1 N-NaOH was added, followed by 30 minutes' standing at room temperature. Then, while the solution was cooled with ice and stirred, 2.7 g. of ethyl S-benzoylxanthogenate was slowly added thereto, resulting in formation of white crystalline precipitate. The crystals were filtered after an hour's subsequent agitation, washed first with water and then with ethyl acetate, and dried to yield 3.2 g. of S-benzoylthiamine having a melting point of 145–147° C.

S-ISOBUTYROYLTHIAMINE

Thiamine chloride hydrochloride 16 g. was added to 56 ml. of 10% aqueous sodium hydroxide, followed by 30 minutes' standing at room temperature. Thereafter under ice cooling and stirring, 10.9 g. of ethyl S-isobutyroylxanthogenate was slowly added to the solution to result in precipitation of white crystals. Stirring was continued for additional 30 minutes, and the precipitated crystals were filtered, washed with water and then with ethyl aceate and dried. Thus 12 g. of S-isobutyroylthiamine having a melting point of 141° C. (dec.) was obtained.

Further, the ethyl S-isobutyroylxanthogenate employed in the above process was prepared in the following method. Potassium xanthogenate 11.5 g. was suspended in 50 ml. of ether, and to the suspension 7.64 g. of isobutyroyl chloride was added at 5–10° C. The resultant mixture was stirred for a few hours and then the ether layer was washed with a small amount of water and dried. Ether was removed to give 11 g. of oily ethyl S-isobutyroylxanthogenate.

On the other hand, concerning inorganic acid salts of O-acylthiamine, there is a known method for their preparation wherein an inorganic acid salt of thiamine is directly reacted with a reactive derivative of carboxylic acid (e.g., acid anhydride and acid chloride). For example, Japanese patent publication No. 15147/1964 discloses O-acetyl-, O-propionyl-, O-butyroyl, O-capryl-, O-lauroyl- and O-benzoylthiamines. Likewise, O-benzoyl-, O-phenylacetyl-, O-isovaleryl-, O-palmitoyl- and O-stearoyl-thiamines are disclosed in Yakugaku Zasshi (J. Pharm. Soc. Japan) 84, 782, (1964).

Inorganic acid salt of O-nicotinoylthiamine has never been disclosed in the literatures. It has now been found that inorganic acid salt of O-nicotinoylthiamine can be readily obtained by treating S-nicotinoylthiamine with inorganic acid in organic solvent, with even better yield compared with those of conventional methods. Examples of appropriate organic solvent include pyridine, chloroform, ethyl acetate, acetone, benzene and the like. It is desirable to use the inorganic acid, for example hydrochloric acid or nitric acid, in anhydrous state, for example in a solution of inorganic acid in alcohol. The reaction is normally performed at the temperature range of 0°–70° C., that of 0°–10° C. being preferred during the initial stage of the reaction. This process can be applied generally for the preparation of inorganic acid salts of O-acylthiamine from S-acylthiamine with better convenience. Specific examples for the preparation of O-acylthiamine in accordance with this process are given hereinbelow.

O-NICOTINOYLTHIAMINE

S-nicotinoylthiamine 4.1 g. was suspended in 60 ml. of pyridine. To the suspension 16 ml. of 30% ethanolic hydrochloric acid was added dropwise under ice cooling and stirring, and then the reaction mixture became homogeneous. The solution was allowed to stand overnight at room temperature, and the crystalline precipitate was filtered and recrystallized from ethanol-water. Thus 4.4 g. of O-nicotinoylthiamine chloride hydrochloride having a melting point of 208–9° C. (dec.) was obtained.

O-BENZOYLTHIAMINE

S-benzoylthiamine 10 g. was suspended in 100 ml. of pyridine, and 20 ml. of 30% ethanolic hydrochloric acid was added to the suspension under ice-cooling and stirring, and then the reaction mixture became homogeneous. In case the solution was allowed to stand overnight at room temperature, and the crystals precipitated were filtered, washed with ethanol and recrystallized from ethanol-water, to yield 10.8 g. of O-benzoylthiamine chloride hydrochloride having a melting point of 227–8° C. (dec.)

The residue Y of the acylating agent of the Formula IV may be halogen atom, radical —OR in which R is as defined in the foregoing, radical —OCOO—$R_4$ in which $R_4$ represents an alkyl preferably having 1–4 carbon atoms, such as —OCOO$C_2H_5$, radical

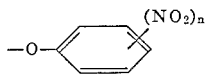

in which $n$ is an integer from 1 to 3, such as p-nitrophenyloxy and 2,4-diinitrophenyloxy, radical

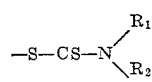

in which $R_1$ and $R_2$ are same as already defined, or radical —S—CS—$OR_3$ in which $R_3$ is the same as already defined. Whereas, the residue Y is not limited to the above enumerated, but can be any radical which promotes acylation.

The acylating reaction can be performed in the manner known per se, in the presence of strong base. As the appropriate strong base, alkali metal hydroxides such as sodium hydroxide and potassium hydroxide and alkali metal alkoxides such as sodium methoxide, potassium methoxide, sodium ethoxide and potassium ethoxide may be used.

The reaction may be performed in a solvent such as water, an alcohol such as methanol and ethanol, a mixture of water and an alcohol, or a mixture of an organic, water-miscible solvent such as dioxane and water, at temperatures in the range of 0°–10° C. The acylating agent of the Formula IV may be added to the reaction system as it is, or added in the form of a solution in an organic solvent such as ethyl acetate and chloroform.

In accordance with this method, as well known, both inorganic acid salt of O-acylthiamine of the Formula II and S-acylthiamines of the Formula III first react with strong base to form thiol-type O-acylthiamine corresponding to the formula

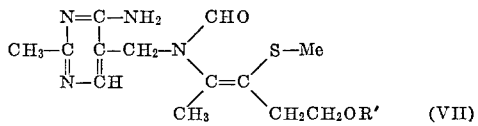

wherein R′ is the same as already defined, and Me is an alkali metal
in the reaction system, which is subsequently acylated by the acylating agent of the Formula IV so that the radical R is introduced into the S-position thereof.

Alternatively, diacylthiamines of the Formula I may be prepared by acting on S-acylthiamine of the Formula III with such an acylating agent selected from those of the Formula IV, in which Y is a halogen atom, radical —OR wherein R is the same as already defined or radical

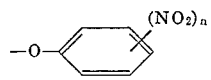

wherein $n$ is the same as already defined, or another radical which promotes O-acylation reaction, in the absence of strong base to effect acylation of the former. This reaction can be carried out with the optional addition of an organic base such as pyridine, triethylamine, etc., in an organic solvent such as chloroform, ethyl acetate, dioxane, and the like. In this case, it is possible to cause the said organic base to serve also as the solvent. The optimum reaction temperature is determined depending on the reaction reagent and the solvent employed. While normally it is performed at 0°–70° C., in case the said organic base is used, the reaction should preferably be performed at relatively low temperatures, for example 0°–10° C.

According to this process, the acyl radical R′ at the S-position of S-acylthiamine of the Formula III remains in the reaction product as it is, without any intramolecular rearrangement, to yield such diacylthiamine corresponding to the formula

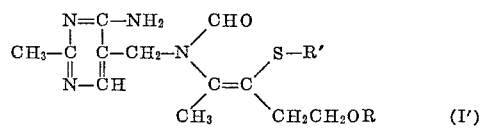

The diacylthiamines of the Formula I can also be obtained by a process comprising acylating inorganic acid salt of thiamine in accordance with the itself accepted practice with an equimolar amount of an acylating agent of the formula

wherein R′ is the same as already defined, and Y′ represents residue of the acylating agent in the presence of a strong base, further acylating the system without isolating the so formed S-acylthiamine with an acylating agent of the Formula IV in the manner known per se in the presence of a strong base. When an inorganic acid salt of thiamine is acylated with an equimolar amount of the acylating agent of the Formula VIII in the presence of a strong base, S-acylthiamine represented by the formula III is formed. The same can be converted to the structure of the Formula VII by further addition of strong base to the system without intervening isolation of the product and can be further acylated in the second stage with the acylating agent of the Formula IV.

The Y′ in the acylating agent of the Formula VIII may be any of the residual groups of the acylating agent mentioned with respect to Y. However, when such acylating agent wherein Y′ is a halogen atom, radical —OR wherein R is the same as already defined, radical —OCOOR$_4$
wherein R$_4$ is the same as already defined, or radical

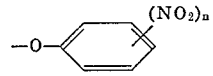

wherein $n$ is the same as already defined, is used, during the acylating procedure by-production of a considerable amount of O, S-diacylthiamine wherein both of the two acyl radicals are R' is observed. Such being objectionable, as the acylating agent VIII, S-acyldithiocarbamate of the formula

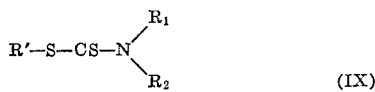

wherein R', R$_1$, and R$_2$ are the same as already defined and alkyl S-acylxanthogenate of the formula $$R'-S-CS-OR_3 \quad (X)$$

wherein R' and R$_3$ are the same as already defined are particularly preferred. With the use of these acylating agents, by-production of O,S-diacylthiamine wherein both of the two acyl radicals are R' in the first stage acylation can be inhibited.

The compounds I wherein both R and R' are nicotinoyl, i.e., O,S-dinicotinoylthiamine can be readily prepared by acylating an inorganic acid salt of thiamine in the manner known per se in the presence of strong base with an acylating agent of the formula

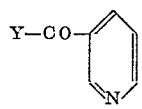

wherein Y is the same as already defined.

The compounds (I) can be readily converted to N-oxides thereof in the manner known per se, for example, by oxidation with hydrogen peroxide in glacial acetic acid.

The acid addition salts of the compounds (I) can be readily prepared by treating the compounds with acid in solvent such as water or alcohol. Acid addition salts of N-oxides of the compounds (I) can also be prepared in the similar manner. Pharmaceutically acceptable acid addition salts include, for example, mono-hydrochloride, di-hydrochloride, mono-hydrobromide, dihydrobromide, mono-hydroiodide, di-hydroiodide, mono-nitrate, di-nitrate, sulfate, phosphate, maleate, succinate, amsonate, embonate and so forth.

In case diacylthiamine (I) is that obtained by acylation of S-acylthiamine (III) with acylhalide in the absence of strong base but in organic solvent, under certain conditions O,S-diacylthiamine hydrohalide may be obtained. For example, using a solvent such as pyridine, chloroform and the like, with the optional addition, during or at the terminal stage of the reaction, of an organic solvent in which O,S-diacylthiamine hydrochloride is very difficultly soluble or insoluble, such as ether, petroleum ether or hexane, crystalline hydrohalide is readily isolated.

Animal test data of some of the compounds (I) are given in Table I to X in contrast with thiamine chloride hydrochloride, a commercially available active vitamin B$_1$ agent, thiamine propyl di-sulfide, known diacylthamine and nicotinic acid.

TABLE I.—GASTROINTESTINAL ABSORPTION

[Distribution of Vitamine B$_1$ (in percent) 30 minutes after injection]

| | Stomach | | | Jejnum | | | Ileum | | |
|---|---|---|---|---|---|---|---|---|---|
| | A | B | C | A | B | C | A | B | C |
| Thiamine chloride hydrochloride | 84.7 | 6.6 | 8.7 | 62.1 | 8.3 | 29.6 | 84.4 | 9.3 | 6.3 |
| S-benzoyl-O-nicotinoylthiamine | 69.0 | 11.6 | 11.4 | 25.0 | 30.8 | 43.4 | 37.2 | 13.4 | 49.4 |
| S-isobutyroyl-O-nicotinoylthiamine | 67.8 | 12.4 | 19.8 | 18.3 | 28.9 | 52.8 | 28.6 | 17.0 | 54.4 |

Mode of administration: Amount equivalent to 500 r. of thiamine chloride hydrochloride was injected into the organ which had been ligated.
Test animals: Rats.
A: In the content of the organ; B: In the tissue of the organ; C: Absorbed.

TABLE II.—VITAMIN B$_1$ LEVEL IN BLOOD AFTER ORAL ADMINISTRATION [μg./dl.]

| | Vitamin B$_1$ Level After— | | | | |
|---|---|---|---|---|---|
| | 0 hr. | 1 hr. | 2 hr. | 3 hr. | 6 hr. |
| Thiamine chloride hydrochloride | 27.3 | 29.7 | 37.6 | 40.1 | 39.7 |
| S-benzoyl-O-nicotinoylthiamine | 22.1 | 69.2 | 68.3 | 62.6 | 50.7 |
| O,S-dinicotinoylthiamine | 24.8 | 52.4 | 53.8 | 54.2 | 47.7 |
| O-benzoyl-S-nicotinoylthiamine | 21.8 | 66.8 | 64.6 | 62.6 | 51.6 |
| S-acetyl-O-nicotinoylthiamine | 21.0 | 81.5 | 66.7 | 63.6 | 56.2 |
| O-nicotinoyl-S-propionylthiamine | 19.4 | 79.6 | 66.8 | 60.9 | 57.5 |
| S-nicotinoyl-O-propionylthiamine | 21.5 | 87.6 | 62.2 | 60.8 | 60.5 |
| S-butyroyl-O-nicotinoylthiamine | 24.4 | 76.6 | 81.7 | 72.1 | 60.1 |
| S-isobutyroyl-O-nicotinoylthiamine | 22.6 | 95.6 | 74.2 | 72.0 | 53.0 |
| O-nicotinoyl-S-valerylthiamine | 24.9 | 82.5 | 72.5 | 69.9 | 55.5 |
| O-acetyl-S-nicotinoylthiamine | 21.6 | 92.8 | 77.3 | 73.0 | 56.6 |
| O-isobutyroyl-S-nicotinoylthiamine | 24.7 | 63.1 | 58.7 | 55.3 | 49.3 |
| O-butyroyl-S-nicotinoylthiamine | 23.0 | 65.7 | 59.7 | 52.1 | 47.5 |
| S-nicotinoyl-O-valerylthiamine | 22.1 | 61.0 | 60.5 | 54.8 | 46.7 |
| Thiamine propyl disulfide | 24.6 | 61.4 | 70.1 | 67.2 | 62.9 |
| O,S-dibenzoylthiamine | 19.2 | 51.4 | 42.5 | 45.9 | 43.1 |

Test animals: Rabbits.
Dosage: Amount equivalent to 5 mg. of thiamine chloride hydrochloride per kg. of body weight.

TABLE III.—VITAMIN B$_1$ LEVEL IN BLOOD AFTER ORAL ADMINISTRATION [μg./dl.]

| | Vitamin B$_1$ Level After— | | | | |
|---|---|---|---|---|---|
| | 0 hr. | 1 hr. | 2 hr. | 3 hr. | 6 hr. |
| Thiamine chloride hydrochloride | 20.6 | 37.5 | 41.0 | 39.1 | 39.1 |
| S-benzoyl-O-nicotinoylthiamine | 23.8 | 235 | 193 | 173 | 128 |
| O,S-dinicotinoylthiamine | 21.6 | 206 | 158 | 139 | 114 |
| O-benzoyl-S-nicotinoylthiamine | 25.3 | 178 | 167 | 137 | 110 |
| S-acetyl-O-nicotinoylthiamine | 22.6 | 228 | 189 | 161 | 143 |
| O-nicotinoyl-S-propionylthiamine | 21.4 | 174 | 223 | 199 | 129 |
| S-nicotinoyl-O-propionylthiamine | 20.9 | 234 | 194 | 177 | 123 |
| S-butyroyl-O-nicotinoylthiamine | 23.5 | 267 | 224 | 201 | 155 |
| S-isobutyroyl-O-nicotinoylthiamine | 22.7 | 359 | 314 | 248 | 180 |
| O-nicotinoyl-S-valerylthiamine | 19.3 | 238 | 207 | 191 | 152 |
| O-acetyl-S-nicotinoylthiamine | 20.4 | 215 | 171 | 143 | 115 |
| Thiamine propyl disulfide | 19.2 | 165 | 150 | 147 | 103 |
| O,S-dibenzoylthiamine | 18.8 | 150 | 133 | 113 | 106 |

Test animals: Rabbits.
Dosage: Amount equivalent to 20 mg. of thiamine chloride hydrochloride per kg. of body weight.

TABLE IV.—VITAMIN B$_1$ LEVEL IN BLOOD AFTER ORAL ADMINISTRATION [μg./dl.]

| | Vitamin B$_1$ Level After— | | | | |
|---|---|---|---|---|---|
| | 0 hr. | 1 hr. | 2 hr. | 3 hr. | 6 hr. |
| Thiamine chloride hydrochloride | 21.4 | 38.1 | 41.5 | 41.3 | 39.6 |
| S-benzoyl-O-nicotinoylthiamine | 20.2 | 441 | 432 | 382 | 313 |
| O,S-dinicotinoylthiamine | 17.4 | 357 | 303 | 256 | 229 |
| O-benzoyl-S-nicotinoylthiamin | 20.2 | 368 | 366 | 313 | 241 |
| S-butyroyl-O-nicotinoylthiamine | 21.3 | 458 | 409 | 341 | 284 |
| S-isobutyroyl-O-nicotinoylthiamine | 22.5 | 706 | 569 | 573 | 423 |
| Thiamine propyl disulfide | 20.2 | 567 | 481 | 425 | 313 |

Test animals: Rabbits.
Dosage: Amount equivalent to 50 mg. of thiamine chloride hydrochloride per kg. of body weight.

TABLE V.—VITAMIN B₁ LEVEL IN LIVER AFTER ORAL ADMINISTRATOR [μg./g.]

|  | Vitamin B₁ Level After— | | |
|---|---|---|---|
|  | 1 hr. | 2 hr. | 4 hr. |
| Normal | 13.9 | | |
| Thiamine chloride hydrochloride | 14.9 | 16.4 | 15.0 |
| S-benzoyl-O-nicotinoylthiamin | 24.2 | 21.2 | |
| O,S-dinicotinoylthiamine | 20.5 | 20.4 | |
| O-benzoyl-S-nicotinoylthiamine | 20.5 | 20.4 | |
| S-isobutyroyl-O-nicotinoylthiamine | 26.1 | 24.6 | 17.4 |
| Thiamine propyl disulfide | 17.1 | 20.4 | 17.6 |

Test animals: Rats.
Dosage: Amount equivalent to 10 mg. of thiamine chloride hydrochloride per kg. of body weight.

TABLE VI.—RESISTIVITY AGAINST ANEURINASES

[Remaining percentage after one hour cultivation]

|  | Aneurinases | |
|---|---|---|
|  | An I (Bacillus thiaminolyticus) MM | An II (Bacillus aneurinolyticus) KA |
| Thiamine chloride hydrochloride | 9.8 | 25.3 |
| S-benzoyl-O-nicotinoylthiamine | 95.1 | 46.0 |
| O,S-dinicotinoylthiamine | 75.5 | 81.1 |
| O-benzoyl-S-nicotinoylthiamine | 66.7 | 52.0 |
| S-butyroyl-O-nicotinoylthiamine | 99.9 | 100.0 |
| S-isobutyroyl-O-nicotinoylthiamine | 100.0 | 92.9 |
| O,S-dibenzoylthiamine | 94.5 | 28.4 |

TABLE VII.—COCARBOXYLASE LEVEL IN BLOOD AFTER ORAL ADMINISTRATION

[μg./dl. calculated as Vitamin B₁]

|  | Cocarboxylase Level After— | | | |
|---|---|---|---|---|
|  | 0 hr. | 1 hr. | 3 hr. | 6 hr. |
| Thiamine chloride hydrochloride | 19.3 | 20.7 | 17.9 | 14.4 |
| S-benzoyl-O-nicotinoylthiamine | 15.4 | 35.9 | 47.3 | 36.8 |
| O,S-dinicotinoylthiamine | 17.6 | 37.5 | 44.2 | 29.0 |
| O-benzoyl-S-nicotinoylthiamine | 17.9 | 37.2 | 46.6 | 37.2 |
| S-butyroyl-O-nicotinoylthiamine | 19.0 | 37.8 | 45.3 | 39.4 |
| S-isobutyroyl-O-nicotinoylthiamine | 19.0 | 39.9 | 59.8 | 47.3 |
| Thiamine propyl disulfide | 20.6 | 38.8 | 45.1 | 35.5 |

Test animals: Rabbits.
Dosage: Amount equivalent to 5 mg. of thiamine chloride hydrochloride per kg. of body weight.

TABLE VIII.—RATIO OF PHOSPHORYLATION IN BLOOD AFTER ORAL ADMINISTRATION

|  | Ratio of Phosphorylation After— | | |
|---|---|---|---|
|  | 1 hr. | 3 hr. | 6 hr. |
| Thiamine chloride hydrochloride | 69.7 | 44.6 | 36.3 |
| S-benzoyl-O-nicotinoylthiamine | 51.9 | 75.6 | 72.6 |
| S-butyroyl-O-nicotinoylthiamine | 49.3 | 62.8 | 65.6 |
| S-isobutyroyl-O-nicotinoylthiamine | 41.7 | 83.1 | 80.2 |
| Thiamine propyl disulfide | 63.2 | 67.1 | 56.4 |

Ratio of phosphorylation = $\frac{\text{Cocarboxylase Level}}{\text{Vitamin B}_1 \text{ Level}} \times 100$.

Test animals: Rabbits.
Dosage: Amount equivalent to 5 mg. of thiamine chloride hydrochloride per kg. of body weight.

TABLE IX.—NAD LEVEL IN LIVER AFTER ORAL ADMINISTRATION

[μg./g.]

|  | NAD Level After— | | | |
|---|---|---|---|---|
|  | 4.5 hr. | 6 hr. | 9 hr. | 15 hr. |
| S-benzoyl-O-nicotinoylthiamine | 1,117 | 1,065 | 1,212 | 771 |
| O,S-dinicotinoylthiamine | 1,057 | 1,080 | 987 | 703 |
| O-benzoyl-S-nicotinoylthiamine | 1,167 | 1,140 | 1,228 | 908 |
| S-butyroyl-O-nicotinoylthiamine | 918 | 933 | 965 | 800 |
| S-isobutyroyl-O-nicotinoylthiamine | 1,006 | 947 | 1,081 | 679 |
| Nicotinic acid | 831 | 757 | 741 | 679 |
| Thiamine chloride hydrochloride plus nicotinic acid | 889 | 727 | 651 | 597 |
| Normal | (595) | | | |

NAD: Nicotinamide adenine dinucleotide.
Test animals: Male rats.
Dosage: Amount equivalent to 100 mg. of nicotinic acid per kg. of body weight.

TABLE X.—ACUTE TOXICITY

[LD₅₀ in mg./kg.]

|  | LD₅₀ | |
|---|---|---|
|  | i.p. | p.o. |
| Thiamine chloride hydrochloride | 315 | 8,500 |
| S-benzoyl-O-nicotinoylthiamine | 595 | >9,000 |
| O,S-dinicotinoylthiamine | 375 | >9,000 |
| O-benzoyl-S-nicotinoylthiamine | 500 | >9,000 |
| S-butyroyl-O-nicotinoylthiamine | 505 | >9,000 |
| S-isobutyroyl-O-nicotinoylthiamine | 490 | >9,000 |
| Thiamine propyl disulfide | 390 | 3,300 |

Test animals: Male ICR mice.
i.p.: Administered as solution in hydrochloric acid of pH 4.5–5.0.
p.o.: Administered as a suspension in an aqueous carboxymethyl cellulose.

Example 1

To a solution of 6 g. of thiamine chloride hydrochloride in 18 ml. of water, 21 ml. of 10% aqueous sodium hydroxide was added under ice cooling followed by 30 minutes' stirring and then 9 g. of nicotinic anhydride was added slowly. During the reaction 10% aqueous sodium hydroxide was occasionally added to keep the reaction mixture alkaline. After the addition of nicotinic anhydride was completed, stirring was continued for 20 minutes, and the reaction mixture was extracted with chloroform. The chloroform layer was washed first with aqueous sodium bicarbonate and then with water and dried over anhydrous sodium sulfate. The chloroform was removed and the residue was recrystallized from ethanol to yield 6.5 g. of O,S - dinicotinoylthiamine having a melting point of 158–9° C.

Example 2

To a solution of 6 g. of thiamine chloride hydrochloride in 40 ml. of water, 21 ml. of 10% aqueous sodium hydroxide was added under ice cooling, followed by 30 minutes' standing. Thereafter 10.6 g. of nicotinoylethylcarbonate was slowly added with stirring, while 10% aqueous sodium hydroxide was added to keep the reaction mixture alkaline. After completion of the addition, stirring was continued for further 20 minutes, and then the reaction mixture was extracted with chloroform. The chloroform layer was washed with water, dried, concentrated, and the residue was recrystallized from alcohol to yield 5.8 g. of colorless, prismatic crystal of O,S-dinicotinoylthiamine having a melting point of 158–9° C.

The nicotinoylethylcarbonate employed in this example was synthesized in the following manner. To wit, 7.26 g. of nicotinic acid was suspended in 120 ml. of anhydrous tetrahydrofuran, and to the suspension 6 g. of triethylamine was added under cooling at −2—−5° C. with a freezing mixture. Then 20 ml. of anhydrous tetrahydrofuran solution containing 6.43 g. of chloroethyl carbonate was added dropwise to the solution with stirring. After completion thereof, stirring was continued for an additional hour at the same temperature and filtered. The filtrate was concentrated under reduced pressure to yield 10.33 g. of porridge like product which can be satisfactorily used for nicotinoylation without purification.

Example 3

To a suspension of 4 g. of S-nicotinoylthiamine in 40 ml. of anhydrous pyridine, 2.2 g. of nicotinoyl chloride hydrochloride was added with stirring, followed by overnight standing. The reaction mixture was then filtered, and the filtrate was concentrated under reduced pressure. Water was added to the residue and the solution was made alkaline with sodium bi-carbonate and extracted with chloroform. The chloroform layer was washed with water, dried over anhydrous sodium sulfate, and concentrated. Recrystallizing the residue from alcohol, 2 g. of O,S-dinicotinoylthiamine having a melting point of 158–9° C. was obtained.

Example 4

To a solution of 3 g. of O-nicotinoylthiamine chloride hydrochloride in 20 ml. of water, 7.9 ml. of 10% aqueous sodium hydroxide was added, followed by 30 minutes' standing. During the reaction maintaining the reaction mixture alkaline, 2.24 g. of nicotinic anhydride was added to the solution in divided portions, and the reaction mixture was extracted with chloroform. The chloroform layer was washed with water, dried and concentrated. Recrystallizing the residue from alcohol, 2.1 g. of O,S-dinicotinoylthiamine having a melting point of 158° C. was obtained.

Example 5

To a suspension of 10 g. of S-benzoylthiamine in 100 ml. of pyridine, 7.2 g. of nicotinic anhydride was added, allowed to stand overnight at room temperature. Pyridine was removed under reduced pressure, and the remaining oily residue was dissolved in water and the solution neutralized with sodium bicarbonate. The oily substance thereupon separated was extracted with chloroform, and the chloroform layer was dried and concentrated. Recrystallizing the residue from ethanol, 9.5 g. of S-benzoyl-O-nicotinoylthiamine having a melting point of 157–8° C. was obtained.

Example 6

To a suspension of 4 g. of S-benzoylthiamine in 40 ml. of pyridine, 2.2 g. of nicotinoyl chloride hydrochloride was added with stirring. The resultant solution was allowed to stand overnight and filtered. The filtrate was concentrated under reduced pressure, and water was added to the residue and the solution was made alkaline with sodium bicarbonate, extracted with chloroform. The chloroform layer was washed with water, dried over anhydrous sodium sulfate and concentrated. Recrystallizing the residue from alcohol, 3 g. of S-benzoyl-O-nicotinoylthiamine having a melting point of 157–8° C. was obtained.

Example 7

To a mixture of 1.93 g. of S-benzoylthiamine, 2 g. of pyridine and 20 ml. of chloroform was added 1.07 g. of nicotinoyl chloride. The mixture was heated under reflux for about 2 hours, followed to stand overnight at room temperature. The reaction mixture was filtered and the filtrate was extracted with hydrochloric acid. Neutralizing the hydrochloric acid solution with sodium bicarbonate, the precipitate formed was extracted with chloroform. The chloroform layer was dried and concentrated. Recrystallizing the resultant residue from ethanol, 1.5 g. of S-benzoyl-O-nicotinoylthiamine having a melting point of 157°–8° C. was obtained.

Example 8

To a solution of 5 g. of O-nicotinoylthiamine chloride hydrochloride in 35 ml. of water, 13 ml. of 10% aqueous sodium hydroxide was added, followed by 30 minutes' standing. Thereafter while maintaining the reaction mixture alkaline, 15 ml. of ether solution containing 1.7 g. of benzoyl chloride was added dropwise thereinto with stirring, to separate an oily substance which was gradually crystallized. The crystals were filtered, washed with water and dried, recrystallized from ethanol to yield 4 g. of S-benzoyl-O-nicotinoylthiamine having a melting point 157–8° C.

Example 9

To a suspension of 1 g. of S-nicotinoylthiamine in 10 ml. of water, 10 ml. of 1% aqueous sodium hydroxide was added under ice cooling, whereupon the crystals were dissolved. Five minutes thereafter 0.36 g. of benzoyl chloride was added to the solution to separate a viscous oily product. The reaction mixture was made weakly alkaline with sodium hydroxide and extracted with chloroform. The chloroform layer was shaken with diluted hydrochloric acid, and the aqueous layer was neutralized with sodium bicarbonate and extracted with chloroform. The chloroform layer was dried and concentrated. The resultant oily substance was gradually crystallized. 0.5 g. of S-benzoyl-O-nicotinoylthiamine having a melting point of 157–8° C. was obtained.

Example 10

To a suspension of 1.9 g. of S-nicotinoylthiamine in 20 ml. of pyridine, 0.84 g. of benzoyl chloride was added under ice cooling, followed by occasional shaking. After about 30 minutes the reaction mixture became homogeneous, which was allowed to stand overnight and the crystals precipitated were filtered off. The filtrate was concentrated under reduced pressure and the residue was dissolved in chloroform and shaken with diluted hydrochloric acid. The aqueous layer was neutralized with sodium bicarbonate and extracted with chloroform. The chloroform layer was dried over anhydrous sodium sulfate and concentrated. Recrystallizing the residue from ethanol, 0.88 g. of O-benzoyl-S-nicotinoylthiamine having a melting point of 139–140° C. was obtained.

Example 11

A mixture of 1 g. of S-nicotinoylthiamine, 0.6 g. of benzoic anhydride and 0.5 ml. of pyridine in 20 ml. of chloroform was allowed to stand overnight. Undissolved materials were filtered off and the filtrate was extracted with diluted hydrochloric acid, followed by the similar subsequent treatments as described in Example 10. Thus 0.8 g. of O-benzoyl-S-nicotinoylthiamine was obtained.

Example 12

O-benzoylthiamine chloride hydrochloride 10 g. was dissolved in 25 ml. of an aqueous solution containing 2.61 g. of sodium hydroxide followed by 30 minutes' stirring, and then 5.9 g. of nicotinic anhydride was added to the solution in divided portions, again followed by 30 minutes' stirring. The reaction mixture was extracted with chloroform and the chloroform layer was extracted with 10% hydrochloric acid. The aqueous layer was decolorized with activated carbon and neutralized with sodium bicarbonate. The substance separated was extracted with chloroform, and the chloroform layer was dried over anhydrous sodium sulfate and concentrated. The residue was crystallized from ethyl acetate. Recrystallizing the same from ethanol, 6.5 g. of O-benzoyl-S-nicotinoylthiamine having a melting point of 139°–140° C. was obtained.

Example 13

To a suspension of 1.29 g. of S-benzoylthiamine in 50 ml. of water, 2 ml. of an aqueous solution containing 0.13 g. of sodium hydroxide was added under ice cooling, followed by 30 minutes' stirring at room temperature and the solution was filtered. Then 0.76 g. of nicotinic anhydride was added to the filtrate in divided portions, followed by 20 minutes' stirring. Whereupon a viscous oily product was separated, which was extracted with chloroform. With the subsequent treatments, viz., extraction of the chloroform layer with diluted hydrochloric acid, neutralization of the resultant aqueous layer with sodium bicarbonate, re-extraction thereof with chloroform, water-washing and drying of the chloroform layer, distillation off the chloroform therefrom, crystallization of the oily residue by addition of a small amount of ethanol and recrystallization from ethanol, 0.7 g. of O-benzoyl-S-nicotinoylthiamine having a melting point of 139–140° C. was obtained.

Example 14

To a solution of 3 g. of O-benzoylthiamine chloride hydrochloride in 20 ml. of water, 7.9 ml. of 10% aqueous sodium hydroxide was added, followed by 30 minutes' standing. To the solution then 1.9 g. of nicotinoyl-ethyl carbonate was added in divided portions while the reaction mixture was kept alkaline, followed by further 30 minutes' stirring. The resultant oily substance was extracted with chloroform. The chloroform layer was subsequently washed with water, dried over anhydrous sodium sulfate, and chloroform was removed. Recrystallizing the residue from alcohol, 2.1 g. of O-benzoyl-S-nicotinoylthiamine having a melting point of 139°–140° C. was obtained.

Example 15

To a solution of 2.3 g. of O-nicotinoylthiamine chloride hydrochloride in 30 ml. of water, 6 ml. of an aqueous solution containing 0.6 g. of sodium hydroxide was added under ice cooling, followed by 30 minutes' stirring, and then 0.95 g. of butyric anhydride was added thereto while the solution was kept alkaline by occasional addition of sodium hydroxide. Thirty minutes thereafter, the oily substance separated was extracted with chloroform. With the subsequent treatments, viz., shaking of the chloroform layer with 30 ml. of 10% hydrochloric acid, neutralization of the hydrochloric acid layer with sodium bicarbonate, re-extraction thereof with chloroform, water-washing of the chloroform layer, drying the same over anhydrous sodium sulfate, concentration thereof and recrystallization of the resultant residue from ethanol-ether, 0.63 g. of S-butyroyl-O-nicotinoylthiamine having a melting point of 97–9° C. was obtained.

Example 16

Using 2.3 g. of O-nicotinoylthiamine chloride hydrochloride and 0.61 g. of acetic anhydride, the treatments of Example 15 were repeated to yield 0.82 g. of S-acetyl-O-nicotinoylthiamine having a melting point of 135–6° C.

Example 17

Using 2.3 g. of O-nicotinoylthiamine chloride hydrochloride and 0.78 g. of propionic anhydride, the treatments of Example 15 were repeated to yield 0.68 g. of O-nicotinoyl-S-propionylthiamine having a melting point of 131–2° C.

Example 18

Using 2.3 g. of O-nicotinoylthiamine chloride hydrochloride and 0.95 g. of isobutyric anhydride, the treatments of Example 15 were repeated to yield 0.68 g. of S-isobutyroyl-O-nicotinoylthiamine having a melting point of 109–111° C.

Example 19

Using 2.3 g. of O-nicotinoylthiamine chloride hydrochloride and 0.72 g. of n-valeryl chloride, the treatments of Example 15 were repeated to yield 0.4 g. of O-nicotinoyl-S-valerylthiamine having a melting point of 94–5° C.

Example 20

To a suspension of 5.9 g. of S-nicotinoylthiamine in 50 ml. of water, 6 ml. of an aqueous solution containing 0.6 g. of sodium hydroxide was added, and after subsequent 15 minutes' stirring, 2.34 g. of propionic anhydride was added thereinto in divided portions. During the reaction, the reaction mixture was kept alkaline by occasional addition of aqueous sodium hydroxide. The reaction mixture was then stirred for 20 minutes, saturated with sodium chloride and extracted with chloroform. The chloroform layer was shaken with diluted hydrochloric acid, and the aqueous layer was again extracted with chloroform after neutralization with sodium bicarbonate. The chloroform layer was washed with saturated solution of sodium chloride, dried over anhydrous sodium sulfate and removed of chloroform by distillation. Recrystallizing the resultant residue from ethanol-ether, 4.1 g. of O-nicotinoyl-S-propionylthiamine having a melting point of 131–2° C. was obtained.

Example 21

To a solution of 2.30 g. of O-nicotinoylthiamine chloride hydrochloride in 6 ml. of water, 15 ml. of 1 N aqueous sodium hydroxide was added, followed by 30 minutes' standing at room temperature and saturation with sodium chloride. Then to the solution an ether solution of 1.38 g. of palmitoyl chloride was added dropwise, followed by 40 minutes' stirring at room temperature. The reaction mixture was then made acidic by addition of diluted hydrochloric acid and extracted with ethyl acetate. The aqueous layer was made alkaline with sodium bicarbonate, and the oily substance thereupon separated was extracted with ethyl acetate, dried over anhydrous sodium sulfate and the solvent was removed. The residue was purified by chromatography on silica gel to give 1.3 g. of O-nicotinoyl-S-palmitoylthiamine having a melting point of 70–72° C.

Example 22

Using 2.30 g. of O-nicotinoylthiamine chloride hydrochloride and 1.5 g. of stearoyl chloride, the treatments of Example 21 were repeated to yield 400 mg. of O-nicotinoyl-S-stearoylthiamine which is an oily substance.

Similarly the following compounds were obtained which were oily substances: S-myristoyl-O-nicotinoylthiamine, S - lauroyl - O - nicotinoylthiamine, S - capryl - O - nicotinoylthiamine.

Example 23

To a suspension of 3.66 g. of S-valerylthiamine in 19 ml. of pyridine, 1.8 g. of nicotinoyl chloride hydrochloride was slowly added under ice cooling and stirring. After about 2 hours' standing at room temperature, hexane was added to the reaction mixture. The insoluble material was siltered off, dissolved in diluted hydrochloric acid and extracted with chloroform. The aqueous layer was made alkaline with sodium bicarbonate and again extracted with chloroform. After drying over anhydrous sodium sulfate of the chloroform layer, the solvent was removed by distillation, and the remaining crude crystalline residue was recrystallized from ethanol-ether. Thus 3 g. of colorless, crystalline O-nicotinoyl-S-valerylthiamine having a melting point of 94–5° C. was obtained.

Example 24

To a suspension of 3.52 of S-butyroylthiamine in 18 ml. of pyridine, 1.8 of nicotinoyl chloride hydrochloride was gradually added under ice cooling and stirring. The subsequent treatments being performed in the same manner as described in Example 23, crude product was obtained which was purified by chromatography on silica gel to give 2.5 g. of colorless, crystalline S-butyroyl-O-nicotinoylthiamine having a melting point of 97–99° C.

Example 25

Using 3.52 g. of S-isobutyroylthiamine and 1.8 g. of nicotinoyl chloride hydrochloride, the treatments of Example 24 were repeated to yield 2.8 g. of S-isobutyroyl-O-nicotinoylthiamine having a melting point of 109–111° C.

Example 26

Using 3.24 g. of S-acetylthiamine and 1.8 g. of nicotinoyl chloride hydrochloride, the treatments of Example 24 were repeated to yield 0.8 g. of S-acetyl-O-nicotinoylthiamine having a melting point 135–6° C.

Example 27

To a suspension of 3.52 g. of S-isobutyroylthiamine in 18 ml. of pyridine, 2.3 g. of nioctinic anhydride was gradually added under ice cooling and stirring. Thereafter the pyridine was removed at a low temperature, and the solution formed by dissolving the residue in water was made alkaline with sodium bicarbonate, followed by chloroform extraction. After being dried over anhydrous sodium sulfate, the chloroform layer was concentrated, and the residue was recrystallized from ethanol-ether to yield 2 g. of S-isobutyroyl-O-nicotinoylthiamine having a melting point of 109–111° C.

Example 28

To a solution of 3.5 g. of O-acetylthiamine hydrochloride in 20 ml. of water, 10 ml. of an aqueous solution containing 1.1 g. of sodium hydroxide was added followed by 30 minutes' stirring. Nicotinic anhydride was added to the solution while the reaction mixture was kept alkaline by occasional addition of aqueous sodium hydroxide. Stirring was continued further for 30 minutes, and the reaction mixture was saturated with sodium chloride and extracted with chloroform. With the subsequent treatments, viz., shaking of the chloroform layer with diluted hydrochloric acid, neutralization of the hydrochloric acid phase with sodium bicarbonate, re-extraction with chloroform, drying of the chloroform layer over anhydrous sodium sulfate, distillation off of the solvent, refining the residue by chromatography on silica gel and recrystallization of the product from ethanol-ether, 1.2 g. of O-acetyl-S-nicotinoylthiamine having a melting point of 105°–7° C. was obtained.

Example 29

To a solution of 8.23 g. of O-propionylthiamine chloride hydrochloride in 30 ml. of water, 10 ml. of an aqueous solution containing 2.4 g. of sodium hydroxide was added under cooling, followed by further addition thereto of nicotinic anhydride after saturation with sodium chloride and then, 20 ml. of chloroform under cooling and stirring. After 15 minutes' stirring, the solution was extracted with chloroform. With the subsequent treatments, viz., extraction of the chloroform layer with diluted hydrochloric acid, addition of sodium bicarbonate to the hydrochloric acid layer to make it alkaline, chloroform extraction of the oily substance thereupon separated, drying of the chloroform layer over anhydrous sodium sulfate, and distillation off of chloroform and refining the residue by chromatography on silica gel 3.2 g. of S-nicotinoyl-O-propionylthiamine having a melting point of 114–5° C. was obtained.

Example 30

To a solution of 4.4 g. of O-valerylthiamine chloride hydrochloride in 10 ml. of water, 20 ml. of an aqueous solution containing 1.2 g. of sodium hydroxide was added under cooling with ice, followed by 15 minutes' standing. After saturation with sodium chloride, first 20 ml. of chloroform was added, and then slowly 2.4 g. of nicotinic anhydride, with stirring. Stirring was continued for further 30 minutes and thereafter the chloroform layer was separated. The remaining aqueous layer was further extracted with chloroform and the resultant chloroform layer was combined with the first separated chloroform layer. With the subsequent treatments, viz., shaking of the chloroform layer with 5% hydrochloric acid, re-extraction with chloroform of the hydrochloric acid layer which was made alkaline with sodium bicarbonate, drying of the chloroform layer over anhydrous sodium sulfate, distillation off of the chloroform, refining 3.5 g. of the resultant residue by chromatography on silica gel and subsequent recrystallization from ether-hexane, 1.2 g. of white, crystalline S-nicotinoyl-O-valerylthiamine having a melting point of 79°–81° C. was obtained.

Example 31

Using 4.3 g. of O-butyroylthiamine chloride hydrochloride and 2.4 g. of nicotinic anhydride, the treatments of Example 30 were repeated to yield 1.5 g. of white, crystalline O-butyroyl-S-nicotinoylthiamine having a melting point of 93–4° C.

Example 32

To a solution of 4.07 g. of O-butyroylthiamine chloride hydrochloride in 50 ml. of water, 12 ml. of an aqueous solution containing 1.2 g. of sodium hydroxide was added under cooling with ice, followed by 30 minutes' stirring and addition of 2.13 g. of nicotinoyl chloride hydrochloride in divided portions. During the reaction, aqueous sodium hydroxide was added to the reaction mixture in order to keep it alkaline. The solution was stirred for further 20 minutes, salted out with sodium chloride and extracted with chloroform. Treating the chloroform layer in the similar manner as described in Example 30, 1.5 g. of O-butyroyl-S-nicotinoylthiamine having a melting point of 93–4° C. was obtained.

Example 33

To a suspension of 5.28 g. of S-butyroylthiamine in 50 ml. of water, 6 ml. of an aqueous solution containing 0.6 g. of sodium hydroxide was added, followed by 20 minutes' stirring and addition of 4.1 g. of nicotinic anhydride in divided portions, while the reaction mixture was kept alkaline. Thereafter the reaction mixture was stirred for 20 minutes, salted out with sodium chloride, and extracted with chloroform. Treating the chloroform layer in the similar manner as described in Example 30, 1.8 g. of O-butyroyl-S-nicotinoylthiamine having a melting point of 93–4° C. was obtained.

Example 34

To a suspension of 3 g. of O-lauroylthiamine chloride hydrochloride in 5 ml. of water 17.4 ml. of 1 N aqueous sodium hydroxide were added, followed by 30 minutes' standing at room temperature and further addition of 1.33 g. of nicotinoyl-ethyl carbonate under cooling and stirring. The solution was stirred for an hour, and the oily substance separated was extracted with chloroform. The chloroform layer was washed first with aqueous sodium bicarbonate and then with water, dried over anhydrous sodium sulfate and removed of the solvent by distillation. Refining the residue by chromatography on silica gel, 420 mg. of an oily substance was obtained, which was identified with O-lauroyl-S-nicotinoylthiamine by its IR spectrum, elementary analysis and hydrolyzate, etc.

In the similar manner the following compounds were obtained as oily substances: S-nicotinoyl-O-stearoylthiamine, S-nicotinoyl-O-palmitoylthiamine, O-myristoyl-S-nicotinoylthiamine.

Example 35

To a suspension of 4 g. of S-nicotinoylthiamine in 30 ml. of pyridine, 1.3 g. of acetic anhydride was added. After an overnight's standing at room temperature, the insoluble material was filtered off and the filtrate was concentrated. The residue was dissolved in diluted hydrochloric acid, and the aqueous layer was extracted with ethyl acetate. With the subsequent treatments, viz., treatment of the aqueous layer with decolorizing carbon, neutralization of the same with sodium bicarbonate, extraction with chloroform, water-washing of the chloroform layer, drying thereof over anhydrous sodium sulfate, concentration refining of the resultant 2.6 g. of the residue by chromatography on silica gel followed by recrystallization from ethanol-ether, 1.5 g. of O-acetyl-S-nicotinoylthiamine having a melting point of 105–7° C. was obtained.

Example 36

Using 4 g. of S-nicotinoylthiamine and 1.5 g. of propionic anhydride, the treatments of Example 35 were repeated to yield 1.2 g. of S-nicotinoyl-O-propionylthiamine having a melting point of 114–5° C.

Example 37

Using 3.94 g. of S-nicotinoylthiamine and 1.1 g. of propionyl chloride, the treatments of Example 35 were repeated to yield 0.9 g. of S-nicotinoyl-O-propionylthiamine having a melting point of 114–5° C.

Example 38

Using 4 g. of S-nicotinoylthiamine and 1.9 g. of butyric anhydride, the treatments of Example 35 were repeated to yield 1.5 g. of O-butyroyl-S-nicotinoylthiamine having a melting point of 93–4° C.

Example 39

To a suspension formed of 2 g. of S-p-methylbenzoyl-thiamine suspended in 20 ml. of anhydrous pyridine, 1.17 g. of nicotinoyl chloride hydrochloride was added under ice cooling and stirring. After an overnight's standing at room temperature, pyridine was removed, the mixture under reduced pressure. Water was added to the residue, which was made alkaline with sodium bicarbonate and extracted with chloroform. The chloroform layer was washed with water, dried over anhydrous sodium sulfate and chloroform was removed under reduced pressure. Recrystallizing the residue from ethanol, 1.59 g. of S-p-methylbenzoyl-O-nicotinoylthiamine having a melting point of 162–3° C. (dec.) was obtained.

Example 40

Using 2 g. of S-p-methoxybenzoylthiamine, 20 ml. of anhydrous pyridine and 1.12 g. of nicotinoyl chloride hydrochloride, the treatments of Example 39 were repeated in exactly the same manner to yield 1.2 g. of S-p-methoxybenzoyl-O-nicotinoylthiamine having a melting point of 145–6° C. (dec.).

Example 41

To a suspension of 53.5 g. of S-benzoylthiamine in 268 ml. of pyridine, 27.12 g. of nicotinoyl chloride hydrochloride was added under ice cooling and stirring. The reaction mixture first became homogeneous and immediately thereafter the crystals began to precipitate. After standing overnight, the crystals were filtered and recrystallized from water to yield 37 g. of S-benzoyl-O-nicotinoylthiamine mono-hydrochloride having a melting point of 179–180° C. (dec.).

Thereafter the mother liquor of the recrystallization was concentrated, and the resultant residue was washed with chloroform and recrystallized from water to yield 18 g. of the same product having a melting point of 179°–180° C. (dec). The total yield was 55 g.

Example 42

To a suspension of 3.5 g. of S-isobutyroylthiamine in 7 ml. of pyridine, 1.78 g. of nicotinoyl chloride hydrochloride was slowly added under ice cooling and stirring. After standing for about 2 hours, a large amount of hexane was added to the reaction mixture, and the oily, insoluble material formed thereupon was thoroughly washed with hexane to be crystallized gradually. Recrystallizing the thus obtained crystals from ethanol-water, 4.1 g. of S-isobutyroyl-O-nicotinoylthiamine mono-hydrochloride (monohydrate) having a melting point of 155–8° C. was obtained.

Example 43

To a solution of 2.29 g. of S-isobutyroyl-O-nicotinoylthiamine in 25 ml. of ethanol, 0.42 ml. (1 mol equivalent) of 37% hydrochloric acid was added, and the solvent was distilled off. The residue was crystallized, and recrystallized from isopropanol to yield 2.47 g. of S-isobutyroyl-O-nicotinoylthiamine mono-hydrochloride (mono-hydrate) having a melting point of 155–8° C.

When 0.84 ml. (2 mol equivalent) of 37% hydrochloric acid was used in the above process, S-isobutyroyl-O-nicotinoylthiamine di-hydrochloride (mono-hydrate) having a melting point of 138–9° C. was obtained.

In the similar manner, the following salts were obtained by the use of each corresponding acid.

| | M.P., ° C. |
|---|---|
| Mono-hydrobromide (mono-hydrate)(dec.) | 138–140 |
| Di-hydrobromide (dec.) | 186–7 |
| Mono-nitrate | 124–8 |
| Di-nitrate (dec.) | 151–153 |
| Mono-hydroiodide | 150–152 |
| Di-hydroiodide (mono-hydrate) (dec.) | 157–158.5 |
| Maleate | 130–132 |
| Succinate | 122–125 |

Example 44

A solution of 2.29 g. of S-isobutyroyl-O-nicotinoylthiamine in 5 ml. of 1 N hydrochloric acid was added dropwise into another solution of 0.93 g. of amsonic acid in 5 ml. of 1 N sodium hydroxide with stirring to form crystalline precipitate. The precipitate was filtered to give 3.22 g. of S-isobutyroyl-O-nicotinoylthiamine amsonate (mono-hydrate) having a melting point of 130–140° C. (dec.).

When the amsonic acid was replaced by embonic acid in the above process, S-isobutyroyl-O-nicotinoylthiamine embonate having a melting point of 80° C. was obtained.

Example 45

To a solution of 6 g. of S-benzoyl-O-nicotinoylthiamine in 60 ml. of glacial acetic acid, 12 ml. of 30% hydroperoxide was added, and after standing for 3 days at room temperature the solution was concentrated under reduced pressure. Water was added to the residue, which was made alkaline with aqueous sodium bicarbonate and extracted with chloroform. The chloroform layer was washed with water, dried over anhydrous sodium sulfate and concentrated. Purifying the residue by chromatography on silica gel and further recrystallizing the same from ethanol, 2 g. of S-benzoyl-O-nicotinoylthiamine-N-oxide having a melting point of 153–155° C. was obtained.

Example 46

To a solution of 4.3 g. of O-isobutyroylthiamine chloride hydrochloride in 10 ml. of water, 20 ml. of an aqueous solution containing 1.2 g. of sodium hydroxide was added under ice cooling and stirring. After a few minutes' stirring the solution was saturated with sodium chloride, followed by addition of first 20 ml. of chloroform and then, slowly, 2.4 g. of nicotinic anhydride with stirring. Thirty minutes thereafter the chloroform layer was separated, and the remaining aqueous layer was again extracted with chloroform. Both chloroform layers were combined and extracted with 5% hydrochloric acid. With the subsequent treatments, viz., neutralization of the resultant aqueous layer with sodium bicarbonate, extraction with chloroform drying over anhydrous sodium sulfate, distillation off of the solvent. The residue was chromatographed over silica gel and the elution with 2% methanol-containing chloroform was concentrated. The resultant crystals were recrystallized from ethanol-ether to give 1.0 g. of O-isobutyroyl-S-nicotinoylthiamine having a melting point of 90–91° C.

Example 47

To a solution of 3.37 g. of thiamine chloride hydrochloride in 20 ml. of water, 10 ml. of an aqueous solution containing 1.20 g. of sodium hydroxide was added under ice cooling and stirring, followed by 30 minutes' stirring. To the solution then 2.42 g. of S-nicotinoyl-N,N-dimethyl-dithiocarbomate was added followed by 20 minutes' stirring and thereafter further addition of 5 ml. of an aqueous solution containing 0.4 g. of sodium hydroxide at room temperature and 15 minutes' subsequent stirring. Under cooling 1.94 g. of methoxyacetic anhydride was added dropwise to the solution followed by 20 minutes' stirring. With the subsequent treatments, viz., chloroform extraction, shaping the chloroform layer with 5% hydrochloric acid, neutralization of the aqueous layer with sodium bicarbonate, another chloroform extraction, drying of the chloroform layer, distillation off of the solvent, purifying the residue by chromatography on silica gel and recrystallization of the product from ethanol-ether, 3.0 g. of S-methoxyacetyl-O-nicotinoyl-thiamine having a melting point of 87–90° C. was obtained.

Example 48

Into a suspension of 1.8 g. of S-furoylthiamine in 10 ml. of pyridine 1.02 g. of nicotinoyl chloride was added under ice cooling. The reaction mixture became homogeneous upon subsequent stirring, which was allowed to stand overnight and thereafter pyridine was removed under reduced pressure.

With the subsequent treatments, viz., extraction of the residue with diluted hydrochloric acid, neutralization with aqueous sodium bicarbonate and chloroform extraction of the aqueous layer, drying of the chloroform layer, distillation off of the solvent, purifying the resultant oily substance by chromatography on silica gel and recrystallization of the product from ethanol, 1 g. of S-furoyl-O-nicotinoylthiamine having a melting point of 160–161° C. was obtained.

Example 49

To a solution of 3.37 g. of thiamine chloride hydrochloride in 30 ml. of water, 12 ml. of 10% aqueous sodium hydroxide was added under ice cooling, followed by 30 minutes' standing. To the solution then 2.42 g. of S-nicotinoyl-N,N-dimethyldithiocarbamate was added with subsequent 30 minutes' stirring, and 4 ml. of 10% aqueous sodium hydroxide was added to the reaction mixture. After stirring for 10 minutes, 2 g. of chloroacetic anhydride was added. Stirring was continued for additional 30 minutes. With the series of following treatments, viz., chloroform extraction of the reaction mixture, shaking the chloroform layer with diluted hydrochloric acid, neutralization of the aqueous layer with aqueous sodium bicarbonate, another chloroform extraction, drying of the chloroform layer, removal of the solvent by distillation, purifying the oily residue by chromatography on silica gel and recrystallization of the product from ethanol, 1.5 g. of S-chloroacetyl-O-nicotinoylthiamine having a melting point of 137–9° C. was obtained.

Example 50

To a solution of 5 g. of O-nicotinoylthiamine chloride hydrochloride in 35 ml. of water, 13 ml. of 10% aqueous sodium hydroxide was added, followed by 30 minutes' standing. Into the solution a chloroform solution containing 2.7 g. of S-benzoyl-N,N-dimethyldithiocarbamate was added dropwise with stirring, the stirring being continued for an additional hour. The chloroform layer was separated, the aqueous layer was extracted with chloroform and the chloroform layers were combined. Thus combined chloroform layer was washed with water, dried and concentrated. Recrystallizing the residue from ethanol, 4.5 g. of S-benzoyl-O-nicotinoylthiamine having a melting point of 157–8° C. was obtained.

Example 51

To a solution formed of 5 g. of O-benzoylthiamine chloride hydrochloride in 20 ml. of water, 13 ml. of 10% aqueous sodium hydroxide was added, followed by 30 minutes' standing and to the solution 2.7 g. of S-nicotinoyl-N,N-dimethyldithiocarbamate was added in divided portions with stirring. Stirring was continued for an hour at room temperature. The reaction mixture was made alkaline with sodium hydroxide and extracted with chloroform. With the subsequent treatments, viz., shaking the chloroform layer with 10% hydrochloric acid, decolorizing treatment of the resultant aqueous layer with activated carbon, neutralization with sodium bicarbonate, another chloroform extraction of the so precipitated substance, drying the chloroform layer, removal of the chloroform by distillation and recrystallization of the residue from ethanol, 4 g. of O-benzoyl-S-nicotinoylthiamine having a melting point of 139–140° C. was obtained.

Example 52

To a solution of 2.3 g. of O-nicotinoylthiamine chloride hydrochloride in a mixed solvent of 30 ml. of water and 20 ml. of ethanol, 6 ml. of an aqueous solution containing 0.6 g. of sodium hydroxide was added under ice cooling, followed by 30 minutes' stirring. To the solution 1.3 g. of 2,4-dinitrophenyl-isobutyrate was added. After 30 minutes water was added to the reaction mixture and the so separated oily substance was extracted with chloroform. The chloroform layer was shaken with 30 ml. of 10% hydrochloric acid, and the resultant hydrochloric acid layer was neutralized with sodium bicarbonate, again extracted with chloroform. The chloroform layer was washed with water, dried and concentrated. Upon recrystallization of the residue from ethanol-ether, 1.5 g. of S-isobutyroyl-O-nicotinoylthiamine having a melting point of 97–9° C. was obtained.

We claim:
1. Diacylthiamines of the formula

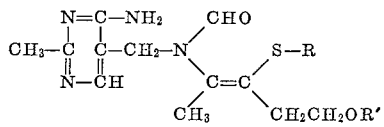

wherein one of the R and R' represents nicotinoyl, and the other represents a member selected from the group consisting of nicotinoyl; benzoyl; alkyl substituted benzoyl, wherein the alkyl group contains from 1–4 carbon atoms; alkoxy substituted benzoyl wherein the alkoxy group has 1–4 carbon atoms; alkanoyl of 1–18 carbon atoms; substituted alkanoyl wherein the substitution is selected from alkoxy of 1–4 carbon atoms, halogen and phenyl, wherein the alkanoyl group has 1–18 carbon atoms; and furoyl, N-oxides thereof and pharmaceutically acceptable acid addition salts thereof.

2. O,S-dinicotinoylthiamine.
3. O-benzoyl-S-nicotinoylthiamine.
4. S-nicotinoyl-O-stearoylthiamine.
5. O-myristoyl-S-nicotinoylthiamine.
6. O-lauroyl-S-nicotinoylthiamine.
7. S-nicotinoyl-O-palmitoylthiamine.
8. S-nicotinoyl-O-propionylthiamine.
9. O-acetyl-S-nicotinoylthiamine.
10. O-isobutyroyl-S-nicotinoylthiamine.
11. O-butyroyl-S-nicotinoylthiamine.
12. S-nicotinoyl-O-valerylthiamine.
13. S-benzoyl-O-nicotinoylthiamine.
14. S-p-methylbenzoyl-O-nicotinoylthiamine.
15. S-p-methoxybenzoyl-O-nicotinoylthiamine.
16. O-nicotinoyl-S-stearoylthiamine.
17. S-lauroyl-O-nicotinoylthiamine.
18. O-nicotinoyl-S-palmitoylthiamine.
19. S-capryl-O-nicotinoylthiamine.
20. S-myristoyl-O-nicotinoylthiamine.
21. S-acetyl-O-nicotinoylthiamine.
22. O-nicotinoyl-S-propionylthiamine.
23. S-butyroyl-O-nicotinoylthiamine.
24. S-isobutyroyl-O-nicotinoylthiamine.
25. O-nicotinoyl-S-valerylthiamine.
26. S-furoyl-O-nicotinoylthiamine.
27. S-methoxyacetyl-O-nicotinoylthiamine.
28. S-chloroacetyl-O-nicotinoylthiamine.
29. S-benzoyl-O-nicotinoylthiamine N-oxide.
30. Process for the preparation of diacylthiamines of the formula:

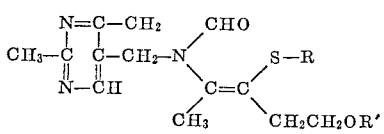

wherein one of R and R' represents nicotinoyl, and the other represents a member selected from nicotinoyl; benzoyl; alkyl substituted benzoyl, wherein the alkyl group contains from 1–4 carbon atoms; alkoxy substituted benzoyl wherein the alkoxy group has 1–4 carbon atoms; alkanoyl of 1–18 carbon atoms; substituted alkanoyl wherein the substitution is selected from alkoxy of 1–4 carbon atoms, halogen and phenyl, wherein the alkanoyl group has 1–4 carbon atoms and furoyl, which comprises acylating an inorganic acid salt of thiamine with an equimolar amount of an acylating agent of the formula:

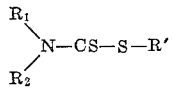

or

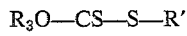

$R_3O-CS-S-R'$ in the presence of a strong base selected from alkali metal hydroxides and alkali metal alkoxides, and further acylating the so formed S-acylthiamine without intervening isolation step with an acylating agent of the formula: Y—R in the presence of a strong base selected from alkali metal hydroxides and alkali metal alkoxides, wherein R' and R have the same meanings as defined above, $R_1$ and $R_2$ each represents alkyl having 1–4 carbon atoms or phenyl, and $R_1$ and $R_2$ when taken together with the nitrogen atom represent a heterocyclic ring, $R_3$ represents alkyl having 1–4 carbon atoms, and Y represents a residue of the acylating agent.

References Cited

UNITED STATES PATENTS

| 2,477,491 | 7/1949 | Miller | 167—81 |
| 2,752,348 | 6/1956 | Matsukawa et al. | 260—256.5 |
| 2,833,768 | 5/1958 | Fujiwara et al. | 260—256.5 |
| 3,272,832 | 9/1966 | Nakano et al. | 167—81 |

OTHER REFERENCES

Kawasaki; Vitamins and Hormones; vol. 21; 1963; pp. 77–8, 87–97, 102–6.

NICHOLAS S. RIZZO, Primary Examiner

R. J. GALLAGHER, Assistant Examiner

U.S. Cl. X.R.

260—256.6, 268, 293.4, 294.8; 424—255